United States Patent
Kanasashi et al.

(10) Patent No.: US 10,030,123 B2
(45) Date of Patent: Jul. 24, 2018

(54) RESIN COMPOSITION, RESIN MOLDED ARTICLE, AND OPTICAL COMPONENT

(71) Applicant: ZEON CORPORATION, Tokyo (JP)

(72) Inventors: Anna Kanasashi, Tokyo (JP); Masaaki Komatsu, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/129,656

(22) PCT Filed: Mar. 23, 2015

(86) PCT No.: PCT/JP2015/058773
§ 371 (c)(1),
(2) Date: Sep. 27, 2016

(87) PCT Pub. No.: WO2015/146925
PCT Pub. Date: Oct. 1, 2015

(65) Prior Publication Data
US 2017/0145191 A1    May 25, 2017

(30) Foreign Application Priority Data

Mar. 28, 2014 (JP) ................................. 2014-070373

(51) Int. Cl.
*C08K 9/00* (2006.01)
*C08K 9/04* (2006.01)
*C08K 3/22* (2006.01)
*G02B 1/04* (2006.01)

(52) U.S. Cl.
CPC ................. *C08K 9/04* (2013.01); *C08K 3/22* (2013.01); *G02B 1/04* (2013.01); *C08K 2003/2237* (2013.01); *C08K 2003/2244* (2013.01); *C08K 2201/003* (2013.01)

(58) Field of Classification Search
CPC .............. C08K 9/04; C08K 3/22; G02B 1/04
See application file for complete search history.

(56) References Cited

U.S. PATENT DOCUMENTS

| 2009/0140284 A1 | 6/2009 | Kurino et al. |
| 2011/0213093 A1 | 9/2011 | Sakurai |
| 2012/0245272 A1* | 9/2012 | Dent ....................... C08G 77/50 524/502 |

FOREIGN PATENT DOCUMENTS

| JP | 11-21469 A | 1/1999 |
| JP | 2006-328261 A | 12/2006 |
| JP | 2008-24735 A | 2/2008 |
| JP | 2008-75078 A | 4/2008 |
| JP | 2008-201634 A | 9/2008 |
| JP | 2009-191167 A | 8/2009 |
| JP | 2009-197323 A | 9/2009 |
| JP | 2010-77280 A | 4/2010 |
| JP | 2011-136871 A | 7/2011 |
| JP | 2011-213505 A | 10/2011 |
| JP | 2012-180241 A | 9/2012 |
| JP | 2013-209501 A | 10/2013 |
| WO | 2007/049573 A1 | 5/2007 |
| WO | 2008/015999 A1 | 2/2008 |

OTHER PUBLICATIONS

Machine Translation of JP 2008-024735.*
International Search Report dated Jun. 16, 2015, issued in counterpart International Application No. PCT/JP2015/058773 (2 pages).

* cited by examiner

*Primary Examiner* — Hannah J Pak
(74) *Attorney, Agent, or Firm* — Westerman, Hattori, Daniels & Adrian, LLP

(57) ABSTRACT

The present invention is a resin composition comprising a transparent resin, and modified inorganic particles obtained by surface-modifying inorganic particles with a modifier, the transparent resin having a saturated water absorption at 37° C. of 0.015 to 0.25 wt %, the inorganic particles having an average particle size of 20 nm or less, and having a refractive index larger than that of the transparent resin by 0.40 or more, a modification ratio of the modified inorganic particles being 15 to 40 wt %, and the modifier being a compound represented by the formula (1) below. Here, $R^1$ represents a hydrocarbon group having 12 to 18 carbon atoms, and X represents a functional group that forms a bond to the surface of the inorganic particles, or an atomic group that comprises the functional group. Also disclosed are a resin formed article and an optical part.

$$R^1—X \qquad (1)$$

7 Claims, No Drawings

RESIN COMPOSITION, RESIN MOLDED ARTICLE, AND OPTICAL COMPONENT

TECHNICAL FIELD

The present invention relates to a resin composition that exhibits excellent processability, and is useful as a material for producing a resin formed article that exhibits high refractive properties and excellent transparency, and rarely undergoes a dimensional change due to absorption of water, a resin formed article that is obtained using the resin composition, and an optical part.

BACKGROUND ART

A material for producing an optical part such as an optical lens is required to exhibit high refractive properties and excellent transparency. Therefore, the refractive index of a resin (e.g., acrylic resin) that exhibits excellent transparency may be increased by adding inorganic particles, and the resulting resin may be used as a material for producing an optical part.

A method that prevents a decrease in transparency of a resin formed article by improving the dispersibility of inorganic particles in the resin formed article through a surface treatment of the inorganic particles has been studied.

For example, Patent Literature 1 discloses a transparent resin composite that includes specific metal oxide particles that have been surface-modified with an organic acid, and a transparent resin such as an acrylate resin.

CITATION LIST

Patent Literature

Patent Literature 1: JP-A-2009-191167

SUMMARY OF INVENTION

Technical Problem

The acrylate resin disclosed in Patent Literature 1 exhibits excellent transparency, but has relatively high water absorption. Since a material having high water absorption easily undergoes a dimensional change due to absorption of water in air, for example, it is difficult to use a material having high water absorption as a material for producing an optical part (e.g., optical lens) for which high dimensional stability is required.

A resin having low water absorption may be used instead of the acrylate resin in order to solve the above problem. In this case, however, when the inorganic particles that have been surface-treated using the method disclosed in Patent Literature 1 are added to the resin, the inorganic particles are not sufficiently dispersed in the resin, whereby the processability and the transparency of the resulting resin composition may deteriorate. As a result, the resulting resin formed article may have a rough surface, or may exhibit inferior transparency.

The invention was conceived in view of the above situation. An object of the invention is to provide a resin composition that exhibits excellent processability, and is useful as a material for producing a resin formed article that exhibits high refractive properties and excellent transparency, and rarely undergoes a dimensional change due to absorption of water, a resin formed article that is obtained using the resin composition, and an optical part.

Solution to Problem

In order to solve the above problem, the inventors conducted extensive studies with regard to a resin composition that includes a transparent resin, and modified inorganic particles obtained by surface-modifying inorganic particles with a modifier. As a result, the inventors found that a resin formed article that exhibits high refractive properties and excellent transparency, and rarely undergoes a dimensional change due to absorption of water, can be obtained with excellent processability by utilizing a resin composition that includes a specific transparent resin, and the modified inorganic particles. This finding has led to the completion of the invention.

According to one aspect of the invention, a resin composition includes a transparent resin, and modified inorganic particles obtained by surface-modifying inorganic particles with a modifier, the transparent resin having a saturated water absorption at 37° C. of 0.015 to 0.25 wt %, the inorganic particles having an average particle size of 20 nm or less, and having a refractive index larger than that of the transparent resin by 0.40 or more, a modification ratio of the modified inorganic particles being 15 to 40 wt %, and the modifier being a compound represented by the following formula (1),

$$R^1\text{—}X \qquad (1)$$

wherein $R^1$ represents a hydrocarbon group having 12 to 18 carbon atoms, and X represents a functional group that forms a bond (or bonds to) to the surface of the inorganic particles, or an atomic group that includes the functional group.

It is preferable that the transparent resin be an alicyclic structure-containing resin.

It is more preferable that the transparent resin be an alicyclic structure-containing hydrocarbon resin that is modified with a polar group-containing compound.

It is preferable that the inorganic particles be metal oxide particles.

It is preferable that the content of the modified inorganic particles in the resin composition be 10 to 85 wt % based on the total content of the transparent resin and the modified inorganic particles.

According to another aspect of the invention, a resin formed article is obtained using the resin composition.

According to a further aspect of the invention, an optical part includes the resin formed article.

Advantageous Effects of Invention

The aspects of the invention thus provide a resin composition that exhibits excellent processability, and is useful as a material for producing a resin formed article that exhibits high refractive properties and excellent transparency, and rarely undergoes a dimensional change due to absorption of water, a resin formed article that is obtained using the resin composition, and an optical part.

DESCRIPTION OF EMBODIMENTS

A resin composition, a resin formed article, and an optical part according to the exemplary embodiments of the invention are described in detail below.

1) Resin Composition

A resin composition according to one embodiment of the invention includes a transparent resin, and modified inorganic particles obtained by surface-modifying inorganic particles with a modifier, the transparent resin having a saturated water absorption at 37° C. of 0.015 to 0.25 wt %, the inorganic particles having an average particle size of 20 nm or less, having a refractive index larger than that of the transparent resin by 0.40 or more, and a modification ratio of the modified inorganic particles being 15 to 40 wt %, and the modifier being a compound represented by the following formula (1).

$$R^1-X \quad (1)$$

wherein $R^1$ represents a hydrocarbon group having 12 to 18 carbon atoms, and X represents a functional group that forms a bond to the surface of the inorganic particles, or an atomic group that includes the functional group.

Note that modified inorganic particles obtained by surface-modifying inorganic particles with a modifier may be referred to herein as "modified inorganic particles", and the inorganic particles before being surface-modified with the modifier may be referred to herein as "inorganic particles".

Transparent Resin

The resin composition according to one embodiment of the invention includes the transparent resin. The term "transparent resin" used herein refers to a resin that has a total light transmittance of 85% or more, the total light transmittance being measured in accordance with ASTM D1003 using a sheet (thickness: 3 mm) formed of the resin.

The transparent resin used in connection with one embodiment of the invention is a polymer that has a saturated water absorption at 37° C. of 0.015 to 0.25 wt %, preferably 0.03 to 0.23 wt %, and more preferably 0.05 to 0.21 wt %. The saturated water absorption at 37° C. may be measured using the method described later in connection with the examples.

A resin composition that is useful as a material for producing an optical part that is required to rarely undergo a dimensional change due to absorption of water and exhibit high dimensional stability, can be obtained by utilizing the transparent resin having a saturated water absorption at 37° C. of 0.25 wt % or less. When the transparent resin having a saturated water absorption at 37° C. of 0.015 wt % or more is used, it is possible to easily disperse the modified inorganic particles in a relatively well-dispersed state as compared with the case where the transparent resin having a saturated water absorption at 37° C. of less than 0.015 wt % is used.

The saturated water absorption is affected by the type of resin, and a substituent that substitutes the resin. A hydrocarbon-based resin normally has low saturated water absorption, and there is a tendency that the saturated water absorption of a resin increases when the resin includes a polar group. Therefore, it is preferable to select an appropriate transparent resin taking account of these properties.

The refractive index of the transparent resin used in connection with one embodiment of the invention is not particularly limited as long as the transparent resin has a refractive index smaller than that of the inorganic particles by 0.4 or more. The refractive index of the transparent resin is normally 1.50 to 1.60. A resin formed article that exhibits high refractive properties and excellent transparency can be obtained by utilizing such a transparent resin.

The refractive index of the transparent resin may be measured using the method described later in connection with the examples.

The number average molecular weight (Mn) of the transparent resin is not particularly limited, but is normally 5,000 to 500,000, preferably 7,000 to 300,000, and more preferably 10,000 to 100,000. The weight average molecular weight (Mw) of the transparent resin is not particularly limited, but is normally 5,000 to 1,000,000, preferably 14,000 to 600,000, and more preferably 15,000 to 250,000. The molecular weight distribution (Mw/Mn) of the transparent resin is not particularly limited, but is preferably 1 to 5, and more preferably 1 to 4.

When the number average molecular weight, the weight average molecular weight, and the molecular weight distribution of the transparent resin are within the above ranges, the resulting resin formed article exhibits mechanical strength and formability in a well-balanced manner.

The weight average molecular weight (Mw) and the number average molecular weight (Mn) of the transparent resin refer to a standard polystyrene-equivalent weight average molecular weight and a standard polystyrene-equivalent number average molecular weight determined by gel permeation chromatography (GPC) (eluent: cyclohexane).

The glass transition temperature of the transparent resin is not particularly limited, but is normally 80 to 250° C., preferably 100 to 200° C., and more preferably 120 to 180° C. The glass transition temperature of the transparent resin refers to a value measured by differential scanning calorimetry (DSC) in accordance with JIS K 7121.

The resin that forms the transparent resin used in connection with one embodiment of the invention is not particularly limited as long as the resin is transparent and has a saturated water absorption at 37° C. of 0.015 to 0.25 wt %. Examples of the resin include a polycarbonate resin, a polyethylene terephthalate resin, a polysulfone resin, a polyarylate resin, a polystyrene resin, an alicyclic structure-containing resin, modified resins obtained by modifying these resins with a polar group-containing compound to adjust the saturated water absorption, and the like.

Among these, an alicyclic structure-containing resin is preferable since an alicyclic structure-containing resin exhibits excellent transparency, and exhibits low water absorption and affinity to the modified inorganic particles in a well-balanced manner.

The term "alicyclic structure-containing resin" used herein refers to a resin that includes a polymer including a repeating unit that includes an alicyclic structure, the skeleton of the polymer substantially including only carbon atoms and hydrogen atoms. Examples of the alicyclic structure included in the alicyclic structure-containing resin include a saturated cyclic hydrocarbon (cycloalkane) structure, an unsaturated cyclic hydrocarbon (cycloalkene) structure, and the like. A polymer that includes a cycloalkane structure is preferable as the alicyclic structure-containing resin since a resin formed article that exhibits excellent transparency and low water absorption can be easily obtained.

The alicyclic structure-containing resin may include the alicyclic structure in the main chain, or may include the alicyclic structure in the side chain. A polymer that includes an alicyclic structure in the main chain is preferable as the alicyclic structure-containing resin since a resin composition that exhibits excellent transparency and low water absorption can be easily obtained. The number of carbon atoms included in the alicyclic structure is not particularly limited, but is normally 4 to 30, preferably 5 to 20, and more preferably 5 to 15.

The content of the repeating unit that includes an alicyclic structure in the alicyclic structure-containing resin may be appropriately selected taking account of the intended use, but is preferably 50 to 100 wt %, more preferably 70 to 100 wt %, and still more preferably 90 to 100 wt %. When the content of the repeating unit that includes an alicyclic structure in the alicyclic structure-containing resin is within the above range, a resin composition that exhibits excellent transparency and low water absorption can be easily obtained.

Examples of the alicyclic structure-containing resin include (1) a norbornene-based polymer, (2) a monocyclic cycloolefin-based polymer, (3) a cyclic conjugation diene-based polymer, (4) a vinyl alicyclic hydrocarbon-based polymer, hydrogenated products of the polymers (1) to (4), and the like. Among these, a norbornene-based polymer or a hydrogenated product thereof is preferable since a resin formed article that exhibits high refractive properties and excellent transparency can be easily obtained.

(1) Norbornene-Based Polymer

The term "norbornene-based polymer" used herein refers to a polymer produced using a compound having a norbornene ring structure as a monomer (i.e., a polymer produced using a norbornene-based monomer).

Examples of the norbornene-based polymer include a ring-opening polymer of a norbornene-based monomer; a ring-opening copolymer of a norbornene-based monomer and an additional monomer that is copolymerizable with the norbornene-based monomer through ring-opening copolymerization; hydrogenated products of these polymers; an addition polymer of a norbornene-based monomer; an addition copolymer of a norbornene-based monomer and an additional monomer that is copolymerizable with the norbornene-based monomer; and the like.

Among these, a hydrogenated product of a ring-opening polymer of a norbornene-based monomer, and a hydrogenated product of a ring-opening polymer of a norbornene-based monomer and an additional monomer that is copolymerizable with the norbornene-based monomer through ring-opening copolymerization, are preferable, since a resin formed article that exhibits high refractive properties and excellent transparency can be easily obtained.

Examples of the norbornene-based monomer include bicyclo[2.2.1]hept-2-ene (trivial name: norbornene) and a derivative thereof (in which the ring is substituted with a substituent), tricyclo[4.3.0$^{1,6}$.1$^{2,5}$]deca-3,7-diene (trivial name: dicyclopentadiene) and a derivative thereof (in which the ring is substituted with a substituent), 7,8-benzotricyclo[4.3.0.1$^{2,5}$]dec-3-ene (trivial name: methanotetrahydrofluorene) and a derivative thereof (in which the ring is substituted with a substituent), tetracyclo[4.4.0.1$^{2,5}$.1$^{7,10}$]dodec-3-ene (trivial name: tetracyclododecene) and a derivative thereof (in which the ring is substituted with a substituent), and the like.

Examples of a substituent that may substitute these norbornene-based monomers include an alkyl group having 1 to 10 carbon atoms (e.g., methyl group), an alkenyl group having 2 to 10 carbon atoms (e.g., vinyl group), an alkylidene group having 2 to 10 carbon atoms (e.g., ethylidene group), and the like.

These norbornene-based monomers may be used either alone or in combination.

Examples of the additional monomer that is copolymerizable with the norbornene-based monomer through ring-opening copolymerization, include a monocyclic cycloolefin-based monomer such as cyclohexene, cycloheptene, and cyclooctene, and the like.

These additional monomers may be used either alone or in combination.

A ring-opening polymer of the norbornene-based monomer, and a ring-opening copolymer of the norbornene-based monomer and the additional monomer that is copolymerizable with the norbornene-based monomer through ring-opening copolymerization, may be obtained by polymerizing the monomer(s) in the presence of a known ring-opening polymerization catalyst.

Examples of the ring-opening polymerization catalyst include a catalyst that includes a halide, a nitrate or an acetylacetone compound of a metal (e.g., molybdenum, ruthenium, tungsten, or osmium), and a reducing agent, a catalyst that includes a halide, a nitrate or an acetylacetone compound of a metal (e.g., titanium, zirconium, tungsten, or molybdenum), and an organoaluminum compound, and the like.

A hydrogenated product of a ring-opening polymer or a ring-opening copolymer of the norbornene-based monomer is normally obtained by adding a known hydrogenation catalyst that includes a transition metal (e.g., nickel or palladium) to a reaction solution obtained by the polymerization reaction, and hydrogenating the carbon-carbon unsaturated bonds included in the ring-opening polymer or ring-opening copolymer.

An addition polymer of the norbornene-based monomer, and an addition copolymer of the norbornene-based monomer and the additional monomer that is copolymerizable with the norbornene-based monomer, may be obtained by polymerizing the monomer(s) in the presence of a known addition polymerization catalyst.

Examples of the addition polymerization catalyst include a catalyst that includes a titanium, zirconium, or vanadium compound, and an organoaluminum compound.

Examples of the additional monomer that is copolymerizable with the norbornene-based monomer through addition copolymerization, include an α-olefin having 2 to 20 carbon atoms, such as ethylene, propylene, 1-butene, 1-pentene, and 1-hexene, and a derivative thereof; a cycloolefin such as cyclobutene, cyclopentene, cyclohexene, cyclooctene, and 3a,5,6,7a-tetrahydro-4,7-methano-1H-indene, and a derivative thereof; a non-conjugated diene such as 1,4-hexadiene, 4-methyl-1,4-hexadiene, 5-methyl-1,4-hexadiene, and 1,7-octadiene; and the like. Among these, an α-olefin is preferable, and ethylene is more preferable.

These additional monomers may be used either alone or in combination.

(2) Monocyclic Cycloolefin-Based Polymer

Examples of the monocyclic cycloolefin-based polymer include an addition polymer of a monocyclic cycloolefin-based monomer (e.g., cyclohexene, cycloheptene, and cyclooctene).

(3) Cyclic Conjugation Diene-Based Polymer

Examples of the cyclic conjugation diene-based polymer include a 1,2- or 1,4-addition polymer of a cyclic conjugation diene-based monomer (e.g., cyclopentadiene and cyclohexadiene), and a hydrogenated product thereof.

(4) Vinyl Alicyclic Hydrocarbon Polymer

Examples of the vinyl alicyclic hydrocarbon polymer include a polymer obtained by polymerizing a vinyl alicyclic hydrocarbon-based monomer such as vinylcyclohexene and vinylcyclohexane, and a hydrogenated product thereof; a hydrogenated product obtained by hydrogenating the aromatic ring of a polymer obtained by polymerizing a vinyl aromatic-based monomer such as styrene and α-methylstyrene; and the like.

When using the alicyclic structure-containing resin as the transparent resin used in connection with one embodiment of the invention, it is preferable to use an alicyclic structure-containing resin that includes a polar group in its polymer structure. When an alicyclic structure-containing resin that includes a polar group in its polymer structure is used as the transparent resin, it is possible to easily and advantageously disperse the modified inorganic particles. The polar group is not particularly limited. Examples of the polar group include a carbonyl-containing group such as a carboxyl group and an acid anhydride group, an epoxy group, an amino group, a silyl group, an isocyanate group, and the like. Among these, a carbonyl-containing group and an epoxy group are preferable, and an acid anhydride group is particularly preferable, from the viewpoint of improving the stability of the transparent resin.

The polar group may be incorporated in the polymer structure of the alicyclic structure-containing resin using an ordinary (arbitrary) method. For example, the polar group may be incorporated in the polymer structure of the alicyclic structure-containing resin using a method that utilizes a polar group-containing monomer as at least part of the monomer, a method that effects polymerization in a state in which a terminal modifier (molecular weight modifier) that includes a polar group is present in the polymerization system, or a method that reacts a polar group-containing compound with the polymer to modify the polymer.

An alicyclic structure-containing hydrocarbon resin that is modified with a polar group-containing compound is particularly preferable as the transparent resin used in connection with one embodiment of the invention since such an alicyclic structure-containing hydrocarbon resin exhibits excellent transparency, and can be easily adjusted in saturated water absorption to the desired range. The term "alicyclic structure-containing hydrocarbon resin" used herein refers to a resin that includes a polymer including a repeating unit that includes an alicyclic structure, the skeleton of the polymer substantially including only carbon atoms and hydrogen atoms. The alicyclic structure-containing hydrocarbon resin is normally a transparent resin having a saturated water absorption at 37° C. of less than 0.015 wt %. The polar group-containing compound (modifier) is reacted with the alicyclic structure-containing hydrocarbon resin to obtain the alicyclic structure-containing hydrocarbon resin modified with the polar group-containing compound. The saturated water absorption at 37° C. of the alicyclic structure-containing hydrocarbon resin is normally improved by modifying the alicyclic structure-containing hydrocarbon resin with the polar group-containing compound.

The polar group-containing compound used as the modifier is not particularly limited. Examples of the polar group-containing compound include an unsaturated acid anhydride such as maleic anhydride, citraconic anhydride, nadic anhydride, and humic anhydride; an unsaturated epoxy compound such as allyl glycidyl ether, 2-methylallyl glycidyl ether, glycidyl acrylate, allyl glycidyl ester, and 5,6-epoxy-1-hexene; an unsaturated carboxylic acid such as acrylic acid, maleic acid, fumaric acid, itaconic acid, citraconic acid, and nadic acid; an unsaturated silane compound such as allyltrimethoxysilane and hexenyltrimethoxysilane; and the like. Among these, an unsaturated acid anhydride is preferable, and maleic anhydride is particularly preferable, due to good affinity to the modified inorganic particles and ease of handling.

Note that the alicyclic structure-containing hydrocarbon resin may be modified with the polar group-containing compound using an ordinary (arbitrary) method. For example, the alicyclic structure-containing hydrocarbon resin and the polar group-containing compound that includes an unsaturated bond may be mixed in the presence of a peroxide such as dicumyl peroxide, and the mixture may be heated.

The modification ratio of the alicyclic structure-containing hydrocarbon resin with the polar group-containing compound may be appropriately determined taking account of the desired saturated water absorption, but is normally 1 to 15 mol %, and preferably 3 to 12 mol %.

The term "modification ratio" used herein in connection with the transparent resin refers to the ratio of the number of moles of the polar group derived from the polar group-containing compound included in the polymer that forms the transparent resin (e.g., alicyclic structure-containing hydrocarbon resin), to the number of moles of the monomer unit included in the polymer. The modification ratio may be calculated from the NMR spectrum, for example.

Inorganic Particles

The modified inorganic particles used in connection with one embodiment of the invention are obtained by surface-modifying inorganic particles with a modifier.

The average particle size (volume average particle size) of the inorganic particles is 20 nm or less, preferably 1 to 17 nm, and more preferably 3 to 15 nm. If the average particle size of the inorganic particles exceeds 20 nm, the resulting resin composition may exhibit low transparency. If the average particle size of the inorganic particles is too small, the inorganic particles may undergo secondary aggregation, and may not exhibit the desired properties.

The average particle size (volume average particle size) of the inorganic particles may be measured in the same manner as the average particle size of the modified inorganic particles (described later in connection with the examples).

The inorganic particles have a refractive index larger than that of the transparent resin by 0.40 or more.

For example, when the refractive index of the transparent resin is 1.50, the inorganic particles having a refractive index of 1.90 or more are used.

A resin composition that exhibits high refractive properties and excellent transparency can be obtained by utilizing the inorganic particles having a refractive index larger than that of the transparent resin by 0.40 or more.

The refractive index of the inorganic particles may be calculated by measuring the difference in refractive index between inorganic particle dispersions that differ in concentration using a spectrophotometric thickness meter (e.g., "FE-3000" manufactured by Otsuka Electronics Co., Ltd.), for example. For example, the refractive index of titanium oxide is 2.6, and the refractive index of zirconium oxide is 2.1.

Groups that include a Group 16 element (e.g., hydroxyl group and mercapto group) are normally present on the surface of the inorganic particles. In one embodiment of the invention, a modifier that includes a functional group (or an atomic group that includes a functional group) that can form a chemical bond with these groups is brought into contact with the inorganic particles to obtain the modified inorganic particles (as described later).

Examples of an inorganic compound that forms the inorganic particles include a metal oxide, a metal sulfide, a metal selenide, a metal telluride, and the like.

Examples of the metal oxide include titanium oxide, zinc oxide, selenium dioxide, zirconium oxide, indium oxide, tin oxide, antimony oxide, and the like.

Examples of the metal sulfide include zinc sulfide, antimony sulfide, and the like.

Examples of the metal selenide include zinc selenide, antimony selenide, and the like.

Examples of the metal telluride include cadmium telluride and the like.

Among these, a metal oxide is preferable, and titanium oxide and zirconium oxide are more preferable.

These inorganic particles may be used either alone or in combination.

The inorganic particles may be produced by using a known method such as the method disclosed in JP-A-2009-197323, the method disclosed in JP-A-2011-213505, or the method disclosed in JP-A-2012-180241, for example.

The modifier that is used to modify the inorganic particles is a compound represented by the following formula (1).

$R^1$ in the formula (1) represents a hydrocarbon group having 12 to 18 carbon atoms.

Examples of the hydrocarbon group having 12 to 18 carbon atoms represented by $R^1$ include a linear or branched alkyl group having 12 to 18 carbon atoms, such as a dodecyl group and a structural isomer thereof, a tridecyl group and a structural isomer thereof a tetradecyl group and a structural isomer thereof, a pentadecyl group and a structural isomer thereof, a hexadecyl group and a structural isomer thereof, a heptadecyl group and a structural isomer thereof, and an octadecyl group and a structural isomer thereof; a linear or branched alkenyl group having 12 to 18 carbon atoms, such as a dodecenyl group and a structural isomer thereof a tridecenyl group and a structural isomer thereof, a tetradecenyl group and a structural isomer thereof, a pentadecenyl group and a structural isomer thereof, a hexadecenyl group and a structural isomer thereof, a heptadecenyl group and a structural isomer thereof, and an octadecenyl group and a structural isomer thereof (including an oleyl group); a linear or branched alkynyl group having 12 to 18 carbon atoms, such as a dodecinyl group and a structural isomer thereof, a tridecinyl group and a structural isomer thereof, a tetradecinyl group and a structural isomer thereof, a pentadecinyl group and a structural isomer thereof, a hexadecinyl group and a structural isomer thereof, a heptadecinyl group and a structural isomer thereof, and an octadecinyl group and a structural isomer thereof; an alicyclic structure-containing hydrocarbon group having 12 to 18 carbon atoms, such as a cyclododecyl group, a cyclododecenyl group, and an 8-(cyclohexyl)octyl group; an aromatic structure-containing hydrocarbon group having 12 to 18 carbon atoms, such as a 6-phenylhexyl group; and the like. Among these, a chain-like hydrocarbon group having 12 to 18 carbon atoms that does not include a ring structure is preferable, and a linear hydrocarbon group having 12 to 18 carbon atoms is particularly preferable, from the viewpoint of improving the dispersibility of the modified inorganic particles in the transparent resin, and obtaining a resin composition that exhibits excellent transparency.

The inorganic particles that have been surface-modified with the modifier that includes a hydrocarbon group having 12 to 18 carbon atoms (i.e., modified inorganic particles) exhibit excellent compatibility with the transparent resin, and exhibit excellent dispersibility in a resin composition solution and a resin formed article. Therefore, the resulting resin composition exhibits excellent transparency and excellent processability even if the content of the modified inorganic particles is increased.

X represents a functional group that forms a bond to the surface of the inorganic particles, or an atomic group that includes the functional group. When the modifier includes a functional group that forms a bond to the surface of the inorganic particles, a condensation reaction occurs between the functional group included in the modifier and a functional group (e.g., hydroxyl group and mercapto group) present on the surface of the inorganic particles, so that the surface of the inorganic particles is modified with the modifier.

Examples of the functional group that forms a bond to the surface of the inorganic particles, include a hydroxyl group; a carboxyl group; a hydrolyzable group such as an alkoxy group having 1 to 10 carbon atoms (e.g., methoxy group and ethoxy group); and the like.

Examples of the atomic group that includes the functional group that forms a bond to the surface of the inorganic particles, include atomic groups respectively represented by the following formulas (2) to (6).

wherein Y represents a hydroxyl group or a hydrolyzable group, each of $Z^1$ and $Z^2$ independently represents a hydrogen atom, a hydroxyl group, a hydrocarbon group having 1 to 18 carbon atoms, or a hydrocarbonoxy group having 1 to 18 carbon atoms, and * represents a bond to $R^1$.

Examples of the hydrocarbon group having 1 to 18 carbon atoms that may be represented by $Z^1$ and $Z^2$ include the groups mentioned above in connection with $R^1$; a hydrocarbon group having 1 to 18 carbon atoms, such as a methyl group, an ethyl group, an n-propyl group, an isopropyl group, a vinyl group, an allyl group, and a phenyl group; and the like.

Examples of the hydrocarbonoxy group having 1 to 18 carbon atoms that may be represented by $Z^1$ and $Z^2$ include a group represented by —$OR^1$; a hydrocarbonoxy group having 1 to 18 carbon atoms, such as a methoxy group, an ethoxy group, a vinyloxy group, an allyloxy group, and a phenoxy group; and the like.

It is preferable that the modifier modify the inorganic particles in a bidentate conformation or a terdentate conformation in order to advantageously disperse the modified inorganic particles in the transparent resin. Therefore, it is more preferable that $Z^1$ in the formulas (2) to (6) be a hydrogen atom or a hydroxyl group.

Specific examples of a compound used as the modifier used in connection with one embodiment of the invention, include a phosphoric ester such as dodecenyl phosphate, tridecenyl phosphate, tetradecenyl phosphate, pentadecenyl phosphate, hexadecenyl phosphate, heptadecenyl phosphate, octadecenyl phosphate, oleyl phosphate, octadecadienyl phosphate, octadecatrienyl phosphate, and dioleyl phosphate; an organic phosphonic acid such as dodecenylphosphonic acid, tridecenylphosphonic acid, tetradecenylphosphonic acid, pentadecenylphosphonic acid, hexadecenylphosphonic acid, heptadecenylphosphonic acid, octadecenylphosphonic acid, oleylphosphonic acid, octadecadienylphosphonic acid, octadecatrienylphosphonic acid, and dioleylphosphonic acid; a phosphonic ester such as dodecenyl phosphonate, tridecenyl phosphonate, tetradecenyl phosphonate, pentadecenyl phosphonate, hexadecenyl phosphonate, heptadecenyl phosphonate, octadecenyl phosphonate, and oleyl phosphonate; a silane compound such as dodecyltrimethoxysilane, octadecyltrimethoxysilane, dodecenyltrimethoxysilane, and pentadecenyltrimethoxysilane; a titanium compound such as dodecyltrimethoxytitanium and octadecyltrimethoxytitanium; a zirconium compound such as dodecyltrimethoxyzirconium and octadecyltrimethoxyzirconium; and the like.

These compounds may be used as the modifier either alone or in combination.

The inorganic particles may be modified with the modifier using an arbitrary method. For example, the inorganic particles may be modified with the modifier using a wet method, or may be modified with the modifier using a dry method. Note that it is preferable to modify the inorganic particles with the modifier using a wet method from the viewpoint of more efficiently modifying the inorganic particles, and preventing secondary aggregation of the inorganic particles. When modifying the inorganic particles with the modifier using a wet method, a dispersion including the inorganic particles may be prepared, and a solution including the modifier may be added dropwise to the dispersion while stirring the dispersion to modify the surface of the inorganic particles, for example.

A solvent used to prepare the dispersion including the inorganic particles is not particularly limited. It is preferable to use water or an alcohol (e.g., methanol, ethanol, propanol, and isopropanol) as the solvent from the viewpoint of advantageously dispersing the inorganic particles. An additional component such as an acid (e.g., formic acid, acetic acid, hydrochloric acid, and nitric acid) and an alkali may be added to the dispersion in order to stabilize the dispersion, for example.

The reaction time when modifying the inorganic particles with the modifier is not particularly limited, but is normally 1 to 48 hours, preferably 2 to 24 hours, and more preferably 12 to 22 hours. The reaction temperature is not particularly limited, but is normally 10 to 100° C., preferably 10 to 600° C., and more preferably 10 to 40° C.

After completion of the reaction, centrifugation may be performed to precipitate the modified inorganic particles. The modified inorganic particles may optionally be washed by (repeatedly) removing the supernatant liquid, re-dispersing the residue in a solvent, and performing centrifugation.

The modification ratio (i.e., the ratio of a component derived from the modifier with respect to the modified inorganic particles) of the modified inorganic particles is 15 to 40 wt %, and preferably 20 to 35 wt %.

When the modification ratio of the modified inorganic particles is within the above range, it is possible to efficiently disperse the modified inorganic particles in the transparent resin, and sufficiently improve the refractive index as a result of dispersing the modified inorganic particles.

The modification ratio of the modified inorganic particles may be measured using the method described later in connection with the examples.

Resin Composition

The resin composition according to one embodiment of the invention includes the transparent resin and the modified inorganic particles.

The content of the modified inorganic particles in the resin composition is preferably 10 to 85 wt %, and more preferably 15 to 45 wt % based on the total content of the transparent resin and the modified inorganic particles. When the content of the modified inorganic particles is within the above range, a resin composition that exhibits higher refractive properties, more excellent transparency, and more excellent processability can be easily obtained.

The resin composition may include an additive in addition to the transparent resin and the modified inorganic particles.

Examples of the additive include a known additive such as an antioxidant, a thermal stabilizer, a light stabilizer, a UV absorber, an antistatic agent, a dispersant, a chlorine scavenger, a flame retardant, a crystallization nucleator, an anti-blocking agent, an anti-clouding agent, a release agent, a pigment, an organic filler, an inorganic filler, a neutralizer, a lubricant, a decomposition agent, a metal deactivator, an anti-pollution material, an antimicrobial agent, an additional resin, and a thermoplastic elastomer.

These additives may be used in an appropriate amount taking account of the intended use as long as the object of the invention is not impaired.

The resin composition according to one embodiment of the invention may be prepared by mixing a solution including the transparent resin and a dispersion including the modified inorganic particles in a specific ratio, for example. In this case, an ultrasonic treatment may be performed in order to sufficiently disperse the modified inorganic particles. According to this method, it is possible to easily and efficiently obtain a solution of the resin composition.

A solvent used to prepare the solution of the resin composition is not particularly limited. Examples of the solvent include a ketone-based solvent such as acetone, methyl ethyl ketone, cyclohexanone, and cyclopentanone; an ester-based solvent such as ethyl acetate; an ether-based solvent such as tetrahydrofuran; a polyol-based solvent such as ethylene glycol and glycerol; a nitrogen-containing compound-based solvent such as N-methylpyrrolidone, pyridine, acetonitrile, and N,N-dimethylformamide; a halogenated aliphatic hydrocarbon-based solvent such as dichloromethane, chloroform, and trichloroethane; a halogenated aromatic hydrocarbon-based solvent such as chlorobenzene and dichlorobenzene; an aliphatic hydrocarbon-based solvent such as pentane, hexane, and heptane; an alicyclic hydrocarbon-based solvent such as cyclopentane and cyclohexane; an aromatic hydrocarbon-based solvent such as benzene, toluene, and xylene; and the like. Among these, a halogenated aliphatic hydrocarbon-based solvent, a halogenated aromatic hydrocarbon-based solvent, an aliphatic hydrocarbon-based solvent, and an aromatic hydrocarbon-based solvent are preferable from the viewpoint of improving the solubility of the transparent resin, and an aliphatic hydrocarbon-based solvent and an aromatic hydrocarbon-based solvent are particularly preferable from the viewpoint of improving the dispersibility of the modified inorganic particles.

The resin composition according to one embodiment of the invention may also be prepared by adding the modified inorganic particles to the transparent resin that has been melted by heating, and kneading the mixture. The mixture may be kneaded using a melt-kneader such as a single-screw extruder, a twin-screw extruder, a Banbury mixer, or a feeder ruder. The kneading temperature is not particularly limited, and may be determined taking account of the melting temperature (softening temperature) of the transparent resin, and the like. The kneading temperature is preferably 160 to 250° C., and more preferably 180 to 220° C. Note that it is preferable to replace the atmosphere inside the kneader with an inert gas (e.g., nitrogen) (preferably having a purity of 99.9% or more) in order to prevent oxidative degradation of the transparent resin.

The resin composition according to one embodiment of the invention is characterized in that the modified inorganic particles are sufficiently dispersed in the transparent resin, and exhibits excellent transparency. For example, a solution of the resin composition (solid content: 10 wt %) in toluene normally has a light transmittance (optical path length: 1 cm) at a wavelength of 600 nm of 90% or more, and preferably 95% or more.

The resin composition according to one embodiment of the invention includes the transparent resin that has low saturated water absorption. The modified inorganic particles are uniformly dispersed in the transparent resin even when the content of the modified inorganic particles is high. Therefore, the resin composition according to one embodiment of the invention exhibits high refractive properties, excellent transparency, and excellent processability, and a resin formed article that rarely undergoes a dimensional change due to absorption of water can be efficiently obtained by utilizing the resin composition according to one embodiment of the invention as a material.

2) Resin Formed Article and Optical Part

A resin formed article according to one embodiment of the invention is obtained using the resin composition according to one embodiment of the invention.

The resin formed article according to one embodiment of the invention may be obtained by forming the resin composition according to one embodiment of the invention by applying a forming method such as a melt injection forming method, a melt extrusion method, a press forming method, a blow forming method, a cast forming method, and a spin coating method either alone or in combination.

Examples of a forming method that is particularly preferably used to obtain the resin formed article according to one embodiment of the invention include a method that forms the resin composition according to one embodiment of the invention by applying a melt extrusion method or a casting method to obtain a film or a sheet, and presses the film or sheet by applying a press forming method to obtain a resin formed article having the desired shape.

The forming conditions may be appropriately determined taking account of the forming method and the resin composition.

The resin temperature when applying a melt forming method is normally 100 to 280° C., preferably 170 to 270° C., and more preferably 200 to 250° C.

The resin composition according to one embodiment of the invention is characterized in that the modified inorganic particles are sufficiently dispersed in the transparent resin. Therefore, the resin composition according to one embodiment of the invention exhibits excellent processability, and a resin formed article that exhibits high refractive properties and excellent transparency can be efficiently obtained by utilizing the resin composition according to one embodiment of the invention.

For example, the resin formed article according to one embodiment of the invention normally has a refractive index larger than that of the transparent resin by 0.04 or more (or 0.065 or more), and exhibits high refractive properties.

The total light transmittance of the resin film having a thickness of 100 μm is normally lower than that of a film formed of the transparent resin that does not include modified inorganic panicles by 10% or less, and preferably 5% or less.

The resin film is characterized in that the modified inorganic particles are sufficiently dispersed in the transparent resin, and can be easily formed again by heating.

The resin formed article according to one embodiment of the invention is useful as various formed articles used in a wide variety of fields.

For example, the resin formed article according to one embodiment of the invention may be used as a medical material; an electrical insulating material; an electronic part treatment material, an optical part, an electronic part such as a light-receiving element window; a structural material and a building material such as a window, a machine part, and a housing; an automotive material such as a bumper, a rear-view mirror, a head light cover, a tail light cover, and an instrument panel; an electrical material such as a speaker cone material, a speaker vibration element, and a microwave oven container; a food container such as a bottle, a return-able bottle, and a feeding bottle; a packaging material such as a cling wrap; a film; a sheet; a helmet; and the like.

It is preferable to use the resin formed article according to one embodiment of the invention as an optical part in order to effectively utilize its characteristics.

Specific examples of the optical part include an optical lens, a light guide plate, a prism sheet, a Fresnel lens, a lenticular lens, an optical disk, an optical disk substrate, a blue laser optical disk, a blue laser optical disk substrate, a magnetooptical disk, a magnetooptical disk substrate, an optical card substrate, an optical waveguide, and the like. In particular, the resin formed article may be used as a Fresnel lens, a lenticular lens, a diffusion or condenser sheet such as a prism sheet, a light guide plate, and the like.

EXAMPLES

The invention is further described below by way of examples. Note that the invention is not limited to the following examples. The units "parts" and "%" used in connection with the following examples and comparative examples respectively refer to "parts by weight" and "wt %" unless otherwise indicated.

The weight average molecular weight, the hydrogenation ratio, the saturated water absorption, the maleic anhydride modification ratio, and the refractive index of the transparent resins A1 to A6 obtained in Production Examples 1 to 6 were measured as described below.

Weight Average Molecular Weight

The weight average molecular weight (standard polystyrene-equivalent weight average molecular weight) was determined by gel permeation chromatography (GPC) (eluent: cyclohexane).

Hydrogenation Ratio

The hydrogenation ratio was calculated from the $^1$H-NMR spectrum using an ordinary method.

Saturated Water Absorption

The transparent resin was immersed in water at 37° C. for 1 week, and the saturated water absorption was calculated from an increase in weight in accordance with ASTM D530 except that the water temperature was changed to 37° C.

Maleic Anhydride Modification Ratio

The maleic anhydride modification ratio (mol %) was calculated from the $^1$H-NMR spectrum.

Refractive Index

A film (thickness: 100 μm) formed only of the transparent resin was produced using a solution of the transparent resin in toluene under the same resin film production conditions as described later, and the refractive index (wavelength: 589 nm) of the resin film was measured at 25° C. using an Abbe refractometer ("DR-M4" manufactured by Atago Co., Ltd.).

Note that the refractive index of the transparent resin is approximately equal to the refractive index of a resin film that is formed only of the transparent resin.

The modification ratio of the modified inorganic particles B1 to B8 obtained in Production Examples 7 to 14, and the average particle size of the modified inorganic particles in the solution were measured as described below.

Modification Ratio 8 mg of the modified inorganic particles were put in an aluminum pan, and heated from 30° C. to 550° C. at a heating rate of 15° C./min using a thermogravimetry/differential thermal analyzer ("TG/DTA6200" manufactured by SII) to measure the weight loss due to heating from 120° C. to 550° C. The modification ratio (i.e., the ratio (amount) (%) of the modifier with respect to the inorganic particles) was calculated on the assumption that the weight loss occurred due to decomposition and removal of the modifier.

Average Particle Size of Modified Inorganic Particles

The particle size of the modified inorganic particles was measured using a particle size measurement system ("ELSZ-100" manufactured by Otsuka Electronics Co., Ltd.), and the volume average particle size (D50) was taken as the average particle size.

Production Example 1: Production of Solution of Transparent Resin A1 in Toluene

A reactor in which the internal atmosphere had been replaced with nitrogen gas, was charged with 500 parts of dehydrated cyclohexane, 0.82 parts of 1-hexene, 0.15 parts of dibutyl ether, and 0.30 parts of triisobutylaluminum at room temperature, which were mixed. The resulting mixture was heated to 45° C. 100 parts of 8-ethylidenetetracyclo [4.4.0.1$^{2,5}$.1$^{7,10}$]dodec-3-ene (herein after abbreviated as "ETCD") and 40 parts of a 0.7% solution of tungsten hexachloride in toluene were continuously added to the mixture over 2 hours while maintaining the temperature of the mixture at 45° C. to effect a polymerization reaction. After completion of the reaction, 1.06 parts of butyl glycidyl ether and 0.52 parts of isopropyl alcohol were added to the reaction mixture to terminate the polymerization reaction. A reaction mixture including an ETCD ring-opening polymer was thus obtained.

After the addition of 270 parts of cyclohexane to 100 parts of the resulting reaction mixture, 5 parts of a nickel-alumina catalyst (manufactured by Nikki Chemical Co., Ltd.) (hydrogenation catalyst) was added to the resulting mixture. After introducing hydrogen gas into the reactor until the pressure inside the reactor reached 5 MPa, the mixture was heated to 200° C. with stirring to effect a hydrogenation reaction at 200° C. for 4 hours. The mixture was then cooled to room temperature to obtain a reaction mixture including a hydrogenated ETCD ring-opening polymer in a ratio of 20%.

After filtering the reaction mixture to remove the hydrogenation catalyst, cyclohexane and other volatile components were removed from the filtrate at a temperature of 270° C. under a pressure of 1 kPa or less using a cylindrical evaporator (manufactured by Hitachi Ltd.), and the hydrogenated ETCD ring-opening polymer in a molten state was extruded from an extruder in the shape of a strand, cooled, and pelletized to obtain pellets of the hydrogenated ETCD ring-opening polymer.

The resulting hydrogenated ETCD ring-opening polymer had a weight average molecular weight of 35,000, a hydrogenation ratio of 99.9%, and a saturated water absorption of 0.008%.

An autoclave was charged with 50 parts of the hydrogenated ETCD ring-opening polymer, 2 parts of maleic anhydride, and 150 parts of tert-butylbenzene, and the mixture was heated to 140° C. to obtain a solution. A solution of dicumyl peroxide in cyclohexanone (dicumyl peroxide: 0.4 parts, cyclohexanone: 10 parts) was added dropwise to the solution with stirring to modify the hydrogenated ETCD ring-opening polymer with maleic anhydride.

After stirring the reaction mixture for 3 hours, the reaction mixture was cooled to room temperature, and diluted with 200 parts of toluene and 500 parts of cyclohexane. The diluted mixture was added dropwise to a mixed solvent including 4,000 parts of isopropyl alcohol and 1,000 parts of acetone to precipitate a maleic anhydride-modified hydrogenated ETCD ring-opening polymer.

The maleic anhydride-modified hydrogenated ETCD ring-opening polymer (white powder) thus precipitated was filtered off, dispersed in a mixed solvent including 400 parts of isopropyl alcohol and 100 parts of acetone, and filtered off again. This washing operation was repeated three times.

A solution including an antioxidant (i.e., a solution prepared by dissolving 0.05 parts of Irganox 1010 in 5 parts of acetone) was added dropwise to the resulting powdery resin, and the mixture was mixed, dried at 120° C. for 48 hours under vacuum (1 Torr or less) to obtain 51 parts of a powdery maleic anhydride-modified alicyclic polymer.

The resulting maleic anhydride-modified alicyclic polymer (hereinafter referred to as "transparent resin A1") had a weight average molecular weight of 39,000, a maleic anhydride modification ratio of 5.0 mol %, a saturated water absorption of 0.08%, and a refractive index of 1.525.

The transparent resin A1 was dissolved in toluene to obtain a 10% solution of the transparent resin A1 in toluene.

Production Example 2: Production of Solution of Transparent Resin A2 in Toluene

A maleic anhydride-modified alicyclic polymer (hereinafter referred to as "transparent resin A2") was obtained in the same manner as in Production Example 1, except that the ratio of maleic anhydride was changed to 4 parts, and the ratio of dicumyl peroxide was changed to 0.8 parts.

The transparent resin A2 had a weight average molecular weight of 39,000, a maleic anhydride modification ratio of 10.0 mol %, a saturated water absorption of 0.15%, and a refractive index of 1.524.

The transparent resin A2 was dissolved in toluene to obtain a 10% solution of the transparent resin A2 in toluene.

Production Example 3: Production of Solution of Transparent Resin A3 in Toluene

A polar group-containing alicyclic polymer having a saturated water absorption of 0.2% ("ARTON D4531" manufactured by JSR Corporation, refractive index: 1.527)

(hereinafter referred to as "transparent resin A3") was dissolved in toluene to obtain a 10% solution of the transparent resin A3 in toluene.

Production Example 4: Production of Solution of Transparent Resin A4 in Toluene

A stainless steel reactor equipped with a stirrer in which the internal atmosphere had been replaced with nitrogen gas, was charged with 960 parts of dehydrated cyclohexane, 40 parts of a mixed monomer (styrene monomer/isoprene monomer=95/5 (weight ratio)), and 3.81 parts of dibutyl ether, which were mixed. The resulting mixture was heated to 40° C. 1.35 parts of a 15% solution of n-butyllithium in n-hexane was added to the mixture with stirring while maintaining the temperature of the mixture at 40° C. to initiate a polymerization reaction. When 10 minutes had elapsed after the initiation of polymerization, 200 parts of a mixed monomer (styrene monomer/isoprene monomer=95/5 (weight ratio)) was continuously added to the mixture over 90 minutes, and the resulting mixture was stirred for 3 hours.

After the addition of 2 parts of isopropyl alcohol as a terminator to the mixture, the resulting mixture was stirred for 1 hour to obtain a reaction mixture including a vinyl aromatic hydrocarbon polymer. The resulting vinyl aromatic hydrocarbon polymer had a weight average molecular weight (Mw) of 180,000 and a molecular weight distribution (Mw/Mn) of 1.08.

1,200 parts of the reaction mixture (solution) including the vinyl aromatic hydrocarbon polymer was transferred to a pressure-resistant reactor equipped with a stirrer. After the addition of 24 parts of a nickel-diatomaceous earth catalyst ("N113" manufactured by JGC Catalysts and Chemicals Ltd., nickel content (amount of nickel supported): 40%), the resulting mixture was stirred (mixed). After replacing the atmosphere inside the reactor with hydrogen gas, hydrogen was supplied to the reactor at 150° C. while stirring the mixture to effect a hydrogenation reaction for 6 hours under a pressure of 70 kg/cm². After completion of the hydrogenation reaction, the reaction mixture was filtered to remove the hydrogenation catalyst. After removing the hydrogenation catalyst, the filtrate was diluted with 1,200 parts of cyclohexane. The diluted mixture was filtered through a filter having a pore size of 1 μm to remove foreign substances. The resulting filtrate was poured into isopropanol to precipitate a hydrogenated vinyl aromatic hydrocarbon polymer. The target product was isolated by filtration, and dried at 100° C. for 48 hours using a vacuum dryer to collect the hydrogenated vinyl aromatic hydrocarbon polymer. The resulting hydrogenated vinyl aromatic hydrocarbon polymer had a glass transition temperature (Tg) of 126° C., a weight average molecular weight (Mw) of 153,000 a molecular weight distribution (Mw/Mn) of 1.30, and a saturated water absorption of 0.09%.

An autoclave was charged with 50 parts of the hydrogenated vinyl alicyclic hydrocarbon polymer, 2 parts of maleic anhydride, and 150 parts of tert-butylbenzene, and the mixture was heated to 140° C. to obtain a solution. A solution of dicumyl peroxide in cyclohexanone (dicumyl peroxide: 0.4 parts, cyclohexanone: 10 parts) was added dropwise to the solution with stirring to modify the hydrogenated vinyl alicyclic hydrocarbon polymer with maleic anhydride.

After stirring the reaction mixture for 3 hours, the reaction mixture was cooled to room temperature, and diluted with 200 parts of toluene and 500 parts of cyclohexane. The diluted mixture was added dropwise to a mixed solvent including 4,000 parts of isopropyl alcohol and 1,000 parts of acetone to precipitate a maleic anhydride-modified hydrogenated vinyl alicyclic hydrocarbon polymer.

The maleic anhydride-modified hydrogenated vinyl alicyclic hydrocarbon polymer (white powder) thus precipitated was filtered off, dispersed in a mixed solvent including 400 parts of isopropyl alcohol and 100 parts of acetone, and filtered off again. This washing operation was repeated three times.

A solution including an antioxidant (i.e., a solution prepared by dissolving 0.05 parts of Irganox 1010 in 5 parts of acetone) was added dropwise to the resulting powdery resin, and the mixture was mixed, and dried at 120° C. for 48 hours under vacuum (1 Torr or less) to obtain 51 parts of a powdery maleic anhydride-modified hydrogenated vinyl alicyclic hydrocarbon polymer.

The resulting maleic anhydride-modified hydrogenated vinyl alicyclic hydrocarbon polymer (hereinafter referred to as "transparent resin A4") had a weight average molecular weight of 162,000, a maleic anhydride modification ratio of 6.5 a saturated water absorption of 0.12%, and a refractive index of 1.509.

The transparent resin A4 was dissolved in toluene to obtain a 10% solution of the transparent resin 4 in toluene.

Production Example 5: Production of Solution of Transparent Resin A5 in Toluene

A reactor in which the internal atmosphere had been replaced with nitrogen gas, was charged with 500 parts of dehydrated cyclohexane, 0.82 parts of 1-hexene, 0.15 parts of dibutyl ether, and 0.30 parts of triisobutylaluminum at room temperature, and the components were mixed. The resulting mixture was heated to 45° C. 100 parts of ETCD and 40 parts of a 0.7% solution of tungsten hexachloride in toluene were continuously added to the mixture over 2 hours while maintaining the temperature of the mixture at 45° C. to effect a polymerization reaction. After completion of the reaction, 1.06 parts of butyl glycidyl ether and 0.52 parts of isopropyl alcohol were added to the reaction mixture to terminate the polymerization reaction. A reaction mixture including an ETCD ring-opening polymer was thus obtained.

After the addition of 270 parts of cyclohexane to 100 parts of the resulting reaction mixture, 5 parts of a nickel-alumina catalyst (manufactured by Nikki Chemical Co., Ltd.) as a hydrogenation catalyst was added to the resulting mixture. After introducing hydrogen gas into the reactor until the pressure inside the reactor reached 5 MPa, the mixture was heated to 200° C. with stirring to effect a hydrogenation reaction at 200° C. for 4 hours. The mixture was then cooled to room temperature to obtain a reaction mixture including a hydrogenated ETCD ring-opening polymer in a ratio of 20%.

After filtering the reaction mixture to remove the hydrogenation catalyst, cyclohexane and other volatile components were removed from the filtrate at a temperature of 270° C. under a pressure of 1 kPa or less using a cylindrical evaporator (manufactured by Hitachi Ltd.), and the hydrogenated ETCD ring-opening polymer in a molten state was extruded from an extruder in the shape of a strand, cooled, and pelletized to obtain pellets of the hydrogenated ETCD ring-opening polymer.

The resulting hydrogenated ETCD ring-opening polymer (hereinafter referred to as "transparent resin A5") had a weight average molecular weight of 35,000, a hydrogenation ratio of 99.9%, a saturated water absorption of 0.008%, and a refractive index of 1.525.

The transparent resin A5 was dissolved in toluene to obtain a 10% solution of the transparent resin A5 in toluene.

Production Example 6: Production of Solution of Transparent Resin A6 in Toluene

A maleic anhydride-modified alicyclic polymer (hereinafter referred to as "transparent resin A6") was obtained in the same manner as in Production Example 1, except that the ratio of maleic anhydride was changed to 6 parts, and the ratio of dicumyl peroxide was changed to 1.2 parts.

The transparent resin A6 had a weight average molecular weight of 39,000, a maleic anhydride modification ratio of 20.0 mol %, a saturated water absorption of 0.3%, and a refractive index of 1.523.

The transparent resin A6 was dissolved in toluene to obtain a 10% solution of the transparent resin A6 in toluene.

Production Example 7: Production of Dispersion of Modified Inorganic Particles B1 in Toluene A container was charged with 15 parts of a dispersion of titanium oxide in methanol ("SRD-M" manufactured by Sakai Chemical Industry Co., Ltd., solid content: 15%, rutile type, average particle size: 11 nm, refractive index: 2.72), and 45 parts of methanol was added to the dispersion at 20° C. with stirring to obtain a diluted dispersion of titanium oxide in methanol.

A solution of lauryl phosphate in methanol (i.e., a solution prepared by dissolving 1.496 parts (i.e., 2.5 mol per kg of titanium oxide) of lauryl phosphate ("Phoslex A-12" manufactured by SC Organic Chemical Co., Ltd.) in 30 parts of methanol) was added dropwise to the diluted dispersion over 1 hour with stirring, and the mixture was stirred at 20° C. for 20 hours to prepare a dispersion of surface-modified titanium oxide in methanol.

The dispersion was centrifuged at 10,000 rpm for 10 minutes to precipitate the surface-modified titanium oxide, and a transparent supernatant liquid was removed. After the addition of 60 parts of ethanol to the precipitate, the mixture was stirred to obtain a dispersion, and the dispersion was centrifuged at 10,000 rpm for 10 minutes to wash the surface-modified titanium oxide. This washing operation was repeated four times. After the addition of 60 parts of toluene to the resulting white precipitate, the mixture was subjected to an ultrasonic treatment for 60 minutes to disperse the surface-modified titanium oxide in toluene. Next, toluene was volatilized at 40° C. over 2 hours or more to obtain titanium oxide (modified inorganic particles B1) that had been surface-modified with lauryl phosphate.

The modification ratio of the modified inorganic particles B1 was 23%.

The modified inorganic particles B1 were dispersed in toluene to obtain a 10% dispersion of the modified inorganic particles B1 in toluene.

The average particle size of the modified inorganic particles B1 included in the dispersion was 14 nm. No aggregation was observed, and the content of particles having a particle size of 200 nm or more was 0%.

Production Example 8: Production of Dispersion of Modified Inorganic Particles B2 in Toluene Zirconium oxide (modified inorganic particles B2) that had been surface-modified with lauryl phosphate was obtained in the same manner as in Production Example 7, except that 7.5 parts of a dispersion of zirconium oxide in methanol ("SZR-M" manufactured by Sakai Chemical Industry Co., Ltd., solid content: 30%, average particle size: 4 nm, refractive index: 2.11) was used instead of the dispersion of titanium oxide in methanol.

The modification ratio of the modified inorganic particles B2 was 20%.

The average particle size of the modified inorganic particles B2 (included in a 10% dispersion of the modified inorganic particles B2 in toluene) was 5 nm. No aggregation was observed, and the content of particles having a particle size of 200 nm or more was 0%.

Production Example 9: Production of Dispersion of Modified Inorganic Particles B3 in Toluene Zirconium oxide (modified inorganic particles B3) that had been surface-modified with oleyl phosphate was obtained in the same manner as in Production Example 8, except that 1.958 parts of oleyl phosphate (manufactured by Tokyo Chemical Industry Co., Ltd., mixture including monooleyl phosphate and dioleyl phosphate) was used as the modifier.

The modification ratio of the modified inorganic particles B3 was 20%.

The average particle size of the modified inorganic particles B3 (included in a 10% dispersion of the modified inorganic particles B3 in toluene) was 6 nm. No aggregation was observed, and the content of particles having a particle size of 200 nm or more was 0%.

Production Example 10: Production of Dispersion of Modified Inorganic Particles B4 in Toluene Zirconium oxide (modified inorganic particles B4) that had been surface-modified with lauryl phosphonate was obtained in the same manner as in Production Example 8, except that 1.495 parts of lauryl phosphonate (manufactured by Wako Pure Chemical Industries, Ltd.) was used as the modifier.

The modification ratio of the modified inorganic particles B4 was 22%.

The average particle size of the modified inorganic particles B4 (included in a 10% dispersion of the modified inorganic particles B4 in toluene) was 6 nm. No aggregation was observed, and the content of particles having a particle size of 200 nm or more was 0%.

Production Example 11: Production of Dispersion of Modified Inorganic Particles B5 in Toluene A container was charged with 7.5 parts of a dispersion of zirconium oxide in methanol ("SZR-M" manufactured by Sakai Chemical Industry Co., Ltd., solid content: 30%, average particle size: 4 nm, refractive index: 2.11), and 217.5 parts of methanol was added to the dispersion at 20° C. with stirring to obtain a 1% dispersion of zirconium oxide in methanol.

A solution prepared by mixing and stirring 1 part of dodecyltrimethoxysilane ("SID4635.0" manufactured by Gelest), 200 parts of isopropyl alcohol, 0.12 parts of purified water, and 0.5 parts of formic acid for 3 hours, was added dropwise to the dispersion of zirconium oxide in methanol with stirring to effect a modification reaction.

After completion of the reaction, solid-liquid separation was effected by ultrafiltration, and toluene was added to the resulting solid to obtain a 10% dispersion of zirconium oxide (modified inorganic particles B5) that had been surface-modified with dodecyltrimethoxysilane. The resulting dispersion was subjected to microfiltration using a membrane filter having a pore size of 0.25 μm.

The modification ratio of the modified inorganic particles B5 was 25%.

The average particle size of the modified inorganic particles B5 (included in the 10% dispersion of the modified inorganic particles B5 in toluene) was 6 nm. No aggregation was observed, and the content of particles having a particle size of 200 nm or more was 0%.

Production Example 12: Production of Dispersion of Modified Inorganic Particles B6 in Toluene The dispersion of the modified inorganic particles B2 in toluene obtained in Production Example 8 was dried at 140° C. for 48 hours under vacuum (1 Torr or less) to obtain a dried residue.

2.25 parts of the dried residue was mixed with a mixed solvent including 40 parts of isopropyl alcohol and 20 parts of toluene, and the mixture was subjected to an ultrasonic treatment for 60 minutes to obtain a transparent dispersion.

A solution prepared by dissolving 0.8 parts of butyl phosphate ("Phoslex A-4" manufactured by SC Organic Chemical Co., Ltd.) in 30 parts of ethanol, was added dropwise to the resulting dispersion at 20° C. with stirring, and the mixture was stirred at 20° C. for 20 hours.

After the addition of 100 parts of methanol to the resulting reaction mixture to effect loose aggregation, the mixture was centrifuged at 1,000 rpm for 10 minutes to precipitate a solid, and a transparent supernatant liquid was removed. After the addition of 60 parts of ethanol to the precipitate, the mixture was stirred to obtain a dispersion, and the dispersion was centrifuged at 10,000 rpm for 10 minutes to wash the modified inorganic particles. This washing operation was repeated four times. After the addition of 60 parts of toluene to the resulting white precipitate, the mixture was subjected to an ultrasonic treatment for 60 minutes to disperse the modified inorganic particles in toluene. Next, toluene was volatilized at 40° C. over 2 hours or more to obtain zirconium oxide (modified inorganic particles B6) that had been modified with lauryl phosphate and butyl phosphate.

The modification ratio of the modified inorganic particles B6 was 32%.

The modified inorganic particles B6 were dispersed in toluene to obtain a 10% dispersion of the modified inorganic particles B6 in toluene.

The average particle size of the modified inorganic particles B6 included in the dispersion was 6 nm. No aggregation was observed, and the content of particles having a particle size of 200 nm or more was 0%.

Production Example 13: Production of Dispersion of Modified Inorganic Particles B7 in Toluene Zirconium oxide (modified inorganic particles B7) that had been surface-modified with ethylhexyl phosphate was obtained in the same manner as in Production Example 8, except that 1.2 parts of ethylhexyl phosphate ("Phoslex A-8" manufactured by SC Organic Chemical Co., Ltd.) was used as the modifier.

The modification ratio of the modified inorganic particles B7 was 14%.

The average particle size of the modified inorganic particles B7 (included in a 10% dispersion of the modified inorganic particles B7 in toluene) was 5 nm. No aggregation was observed, and the content of particles having a particle size of 200 nm or more was 0%.

Production Example 14: Production of Dispersion of Modified Inorganic Particles B8 in Toluene Zirconium oxide (modified inorganic particles B8) that had been surface-modified with lauryl phosphate was obtained in the same manner as in Production Example 8, except that the ratio of lauryl phosphate was changed to 0.36 parts.

The modification ratio of the modified inorganic particles B8 was 14%.

The average particle size of the modified inorganic particles B8 (included in a 10% dispersion of the modified inorganic particles B8 in toluene) was 6 nm. No aggregation was observed, and the content of particles having a particle size of 200 am or more was 0%.

Example 1

Production of Resin Composition 60 parts of the 10% solution of the transparent resin A1 in toluene obtained in Production Example 1, and 40 parts of the 10% dispersion of the modified inorganic particles B1 in toluene obtained in Production Example 7, were mixed, and the mixture was subjected to an ultrasonic treatment at 30° C. for 60 minutes to obtain a solution of a resin composition in toluene.

Production of Resin Film

The resulting solution of the resin composition in toluene was heated to 80° C. to concentrate the solution so as to have a concentration of 50%. The solution was dropped onto a glass sheet, spread (applied) using a doctor blade (film applicator) (200 μm), dried at 50° C. (primary drying), dried at 120° C. (secondary drying), and again dried at 120° C. for 5 hours or more under vacuum to obtain a resin film having a thickness of 100 μm.

Example 2

A resin composition and a resin film were obtained in the same manner as in Example 1, except that the 100% dispersion of the modified inorganic particles B2 in toluene obtained in Production Example 8 was used instead of the 10% dispersion of the modified inorganic particles B1 in toluene obtained in Production Example 7.

Example 3

A resin composition and a resin film were obtained in the same manner as in Example 2, except that the 10% solution of the transparent resin A2 in toluene obtained in Production Example 2 was used instead of the 10% solution of the transparent resin A1 in toluene obtained in Production Example 1.

Example 4

A resin composition and a resin film were obtained in the same manner as in Example 3, except that the 10% dispersion of the modified inorganic particles B3 in toluene obtained in Production Example 9 was used instead of the 10% dispersion of the modified inorganic particles B2 in toluene obtained in Production Example 8.

Example 5

A resin composition and a resin film were obtained in the same manner as in Example 3, except that the 10% dispersion of the modified inorganic particles B4 in toluene obtained in Production Example 10 was used instead of the 10% dispersion of the modified inorganic particles B2 in toluene obtained in Production Example 8.

Example 6

A resin composition and a resin film were obtained in the same manner as in Example 3, except that the 10% dispersion of the modified inorganic particles B5 in toluene obtained in Production Example 11 was used instead of the 10% dispersion of the modified inorganic particles B2 in toluene obtained in Production Example 8.

Example 7

A resin composition and a resin film were obtained in the same manner as in Example 3, except that the 10% dispersion of the modified inorganic particles B6 in toluene obtained in Production Example 12 was used instead of the 10% dispersion of the modified inorganic particles B2 in toluene obtained in Production Example 8.

Example 8

A resin composition and a resin film were obtained in the same manner as in Example 2, except that the 10% solution of the transparent resin A3 in toluene obtained in Production Example 3 was used instead of the 10% solution of the transparent resin A1 in toluene obtained in Production Example 1.

Example 9

A resin composition and a resin film were obtained in the same manner as in Example 2, except that the 10% solution of the transparent resin A4 in toluene obtained in Production Example 4 was used instead of the 10% solution of the transparent resin A1 in toluene obtained in Production Example 1.

Comparative Example 1

A resin film was obtained in the same manner as in Example 1, except that the 10% solution of the transparent resin A5 in toluene obtained in Production Example 5 was used instead of the resin composition obtained in Example 1.

Comparative Example 2

A resin composition and a resin film were obtained in the same manner as in Example 2, except that the 10% solution of the transparent resin A5 in toluene obtained in Production Example 5 was used instead of the 10% solution of the transparent resin A1 in toluene obtained in Production Example 1.

Comparative Example 3

A resin composition and a resin film were obtained in the same manner as in Example 2, except that the 10% solution of the transparent resin A6 in toluene obtained in Production Example 6 was used instead of the 10% solution of the transparent resin A1 in toluene obtained in Production Example 1.

Comparative Example 4

A resin composition and a resin film were obtained in the same manner as in Example 3, except that the 10% dispersion of the modified inorganic particles B7 in toluene obtained in Production Example 13 was used instead of the 10% dispersion of the modified inorganic particles B2 in toluene obtained in Production Example 8.

Comparative Example 5

A resin composition and a resin film were obtained in the same manner as in Example 3, except that the 10% dispersion of the modified inorganic particles B8 in toluene obtained in Production Example 14 was used instead of the 10% dispersion of the modified inorganic particles B2 in toluene obtained in Production Example 8.

The properties of the resin compositions and the resin films obtained in Examples 1 to 9 and Comparative Examples 1 to 5 were measured and evaluated as described below.

Transparency of Solution of Resin Composition

The light transmittance (wavelength: 600 nm) of the 10% solution of the resin composition in toluene was measured using a spectrophotometer ("V-570" manufactured by JASCO Corporation, optical path length: 1 cm), and the transparency of the solution was evaluated in accordance with the following standard.

Good: 90% or more
Bad: Less than 90%

Transparency of Resin Film

The total light transmittance of the resin film was measured in accordance with JIS K 7361-1 using a spectrophotometer ("V-570" manufactured by JASCO Corporation). The total light transmittance of the resin film thus measured was compared with the total light transmittance of the resin film (that did not include modified inorganic particles) obtained in Comparative Example 1, and the transparency of the resin film was evaluated in accordance with the following standard.

Good: A decrease in total light transmittance with respect to the total light transmittance of the resin film obtained in Comparative Example 1 was 10% or less.
Bad: A decrease in total light transmittance with respect to the total light transmittance of the resin film obtained in Comparative Example 1 was more than 10%.

Processability of Resin Film

The resin film having a thickness of 100 μm was cut to have a size of 2 mm×2 mm. 3 g of the cut films were collected, and vacuum-pressed at 200° C. for 20 minutes under a pressure of 20 MPa. Whether or not the cut films could be melted to form a single film was determined in accordance with the following standard.

Good: No cutting mark was observed.
Bad: A cutting mark was observed.

Refractive Index of Resin Film

The refractive index (wavelength: 589 nm) of the resin film having a thickness of 100 μm was measured at 25° C. using an Abbe refractometer ("DR-M4" manufactured by Atago Co., Ltd.).

A film formed only of the transparent resin was produced as a control sample using the solution of the transparent resin in toluene used in each sample under the same conditions as those employed for each sample. A case where an increase in refractive index by 0.04 or more was observed with respect to the control sample was evaluated as "Good", and a case where an increase in refractive index by 0.04 or more was not observed with respect to the control sample was evaluated as "Bad".

Table 1 shows the type, the maleic acid modification ratio (mol %), and the saturated water absorption (%) at 37° C. of the transparent resins used in Examples 1 to 9 and Comparative Examples 1 to 5, the type, the average particle size (nm), and the modification ratio (%) of the inorganic particles and the modifier used in Examples 1 to 9 and Comparative Examples 1 to 5, the content (%) of the modified inorganic particles, the evaluation results for the transparency of the solution of the resin composition, the evaluation results for the transparency of the resin film, the evaluation results for the processability of the resin film, and the evaluation results for the refractive index of the resin film.

The following were confirmed from the results shown in Table 1.

The solutions of the resin compositions and the resin films obtained in Examples 1 to 9 were characterized in that the modified inorganic particles were sufficiently dispersed in the transparent resin, and exhibited excellent transparency and excellent processability.

The resin film obtained in Comparative Example 1 that did not include modified inorganic particles had a low refractive index.

The solutions of the resin compositions and the resin films obtained in Comparative Examples 2 to 5 were characterized in that the modified inorganic particles were not sufficiently dispersed in the transparent resin, and exhibited inferior transparency or inferior processability.

The invention claimed is:

1. A resin composition comprising a transparent resin, and modified inorganic particles obtained by surface-modifying inorganic particles with a modifier, the transparent resin having a saturated water absorption at 37° C. of 0.015 to 0.25 wt %, the inorganic particles of the modified inorganic particles having an average particle size of 20 nm or less, and having a refractive index larger than that of the transparent resin by 0.40 or more, a modification ratio of the modified inorganic particles being 15 to 40 wt %, and the modifier being a compound represented by a formula (1), $$R^1-X \quad (1)$$

TABLE 1

|  |  |  | Example | | | | | | |
|---|---|---|---|---|---|---|---|---|---|
|  |  |  | 1 | 2 | 3 | 4 | 5 | 6 | 7 |
| Transparent resin |  | Type | A1 | A1 | A2 | A2 | A2 | A2 | A2 |
|  |  | Maleic acid modification ratio (mol %) | 5 | 5 | 10 | 10 | 10 | 10 | 10 |
|  |  | Saturated water absorption (%) at 37° C. | 0.08 | 0.08 | 0.15 | 0.15 | 0.15 | 0.15 | 0.15 |
| Modified inorganic particles |  | Type | B1 | B2 | B2 | B3 | B4 | B5 | B6 |
|  | Inorganic particles | Type | $TiO_2$ | $ZrO_2$ | $ZrO_2$ | $ZrO_2$ | $ZrO_2$ | $ZrO_2$ | $ZrO_2$ |
|  |  | Average particle size (nm) | 11 | 4 | 4 | 4 | 4 | 4 | 4 |
|  | Modifier | Butyl phosphate | — | — | — | — | — | — | Used |
|  |  | Ethylhexyl phosphate | — | — | — | — | — | — | — |
|  |  | Lauryl phosphate | Used | Used | Used | — | — | — | Used |
|  |  | Oleyl phosphate | — | — | — | Used | — | — | — |
|  |  | Lauryl phosphonate | — | — | — | — | Used | — | — |
|  |  | Dodecyltrimethoxysilane | — | — | — | — | — | Used | — |
|  |  | Modification ratio (%) | 23 | 20 | 20 | 20 | 22 | 25 | 32 |
| Content (%) of modified inorganic particles |  |  | 40 | 40 | 40 | 40 | 40 | 40 | 40 |
| Transparency of solution of resin composition |  |  | Good | Good | Good | Good | Good | Good | Good |
| Transparency of resin film |  |  | Good | Good | Good | Good | Good | Good | Good |
| Processability of resin film |  |  | Good | Good | Good | Good | Good | Good | Good |
| Refractive index of resin film |  |  | Good | Good | Good | Good | Good | Good | Good |

|  |  |  | Example | | Comparative Example | | | | |
|---|---|---|---|---|---|---|---|---|---|
|  |  |  | 8 | 9 | 1 | 2 | 3 | 4 | 5 |
| Transparent resin |  | Type | A3 | A4 | A5 | A5 | A6 | A2 | A2 |
|  |  | Maleic acid modification ratio (mol %) | — | 4.5 | 0 | 0 | 20 | 10 | 10 |
|  |  | Saturated water absorption(%) | 0.2 | 0.12 | 0.008 | 0.008 | 0.3 | 0.15 | 0.15 |
| Modified inorganic particles |  | Type | B2 | B2 | — | B2 | B2 | B7 | B8 |
|  | Inorganic particles | Type | $ZrO_2$ | $ZrO_2$ | — | $ZrO_2$ | $ZrO_2$ | $ZrO_2$ | $ZrO_2$ |
|  |  | Average particle size (nm) | 4 | 4 | — | 4 | 4 | 4 | 4 |
|  | Modifier | Butyl phosphate | — | — | — | — | — | Used | — |
|  |  | Ethylhexyl phosphate | — | — | — | — | — | — | — |
|  |  | Lauryl phosphate | Used | Used | — | Used | Used | — | Used |
|  |  | Oleyl phosphate | — | — | — | — | — | — | — |
|  |  | Lauryl phosphonate | — | — | — | — | — | — | — |
|  |  | Dodecyltrimethoxysilane | — | — | — | — | — | — | — |
|  |  | Modification ratio (%) | 20 | 20 | — | 20 | 20 | 14 | 14 |
| Content (%) of modified inorganic particles |  |  | 20 | 40 | — | 40 | 40 | 40 | 40 |
| Transparency of solution of resin composition |  |  | Good | Good | Good | Bad | Good | Bad | Bad |
| Transparency of resin film |  |  | Good | Good | Good | Bad | Good | Bad | Bad |
| Processability of resin film |  |  | Good | Good | Good | Good | Bad | — | — |
| Refractive index of resin film |  |  | Good | Good | Bad | — | Good | — | — |

Note:
The item "Content (%) of modified inorganic particles" refers to the content (%) of the modified inorganic particles based on the total content of the transparent resin and the modified inorganic particles.

wherein $R^1$ represents a hydrocarbon group having 12 to 18 carbon atoms, and X represents a functional group that forms a bond to the surface of the inorganic particles, or an atomic group that comprises the functional group that forms a bond to the surface of the inorganic particles, wherein the modification ratio is a ratio of a component derived from the modifier with respect to the modified inorganic particles.

2. The resin composition according to claim 1, wherein the transparent resin is an alicyclic structure-containing resin.

3. The resin composition according to claim 2, wherein the transparent resin is an alicyclic structure-containing hydrocarbon resin that is modified with a polar group-containing compound.

4. The resin composition according to claim 1, wherein the inorganic particles of the modified inorganic particles are metal oxide particles.

5. The resin composition according to claim 1, wherein a content of the modified inorganic particles in the resin composition is 10 to 85 wt % based on a total content of the transparent resin and the modified inorganic particles.

6. A resin formed article obtained from the resin composition according to claim 1 by applying a melt injection forming method, a melt extrusion method, a press forming method, a blow forming method, a cast forming method, and a spin coating method either alone or in combination.

7. An optical part comprising the resin formed article according to claim 6.

* * * * *